United States Patent [19]

Irii et al.

[11] 4,439,581
[45] Mar. 27, 1984

[54] METHOD FOR THE PRODUCTION OF MICROCAPSULES

[75] Inventors: Shinsuke Irii, Nishinomiya; Tomoharu Shiozaki, Amagasaki, both of Japan

[73] Assignee: Kansaki Paper Manufacturing Co., Ltd., Tokyo, Japan

[21] Appl. No.: 411,923

[22] Filed: Aug. 26, 1982

[30] Foreign Application Priority Data

Sep. 3, 1981 [JP] Japan .................. 56-139504
May 20, 1982 [JP] Japan .................. 57-87035

[51] Int. Cl.³ ............................................ C08L 75/00
[52] U.S. Cl. .................. 524/839; 523/200; 523/206; 524/801; 526/201
[58] Field of Search ............... 523/200, 206; 524/839; 526/201

[56] References Cited

U.S. PATENT DOCUMENTS 3,886,085  5/1975  Kiritani et al. .................. 264/4

Primary Examiner—Joseph L. Schofer
Assistant Examiner—J. M. Reddick
Attorney, Agent, or Firm—Morgan, Finnegan, Pine, Foley & Lee

[57] ABSTRACT

A hydrophobic liquid including a polyvalent isocyanate therein is dispersed in an aqueous medium in the presence of a specific polymer dissolved therein to form an emulsion system for producing microcapsules. The specific polymer dissolved in the aqueous medium is a homopolymer or copolymer including monomer units represented by the general formula:

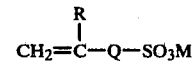

wherein R is hydrogen or alkyl, M is ammonium, sodium, potassium, lithium or hydrogen and Q is further represented by

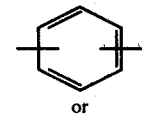

or

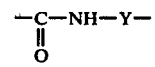

wherein Y is methylene, ethylene or polymethylene having 3 to 10 carbon atoms, which methylene, ethylene or polymethylene may be substituted by at least one alkyl.

15 Claims, No Drawings

METHOD FOR THE PRODUCTION OF MICROCAPSULES

BACKGROUND OF THE INVENTION

This invention relates to a method for the production of microcapsules containing hydrophobic capsule core material and more particularly to an improved method for the production of microcapsules each having a polyurea capsule wall which are useful for the manufacture of pressure-sensitive copying paper.

Microcapsules find their usefulness in various fields such as pressure-sensitive copying papers, heat-sensitive recording papers, adhesives, fertilizers, pharmaceuticals, foods, cosmetics, etc. There are known various method for making microcapsules useful for those purposes. Among them, there are included the "coacervation" method, the "interfacial polymerization" method and the "in situ polymerization" method. The most typical capsule wall material in the "coacervation" method is one of the gelatin-gum arabic type which is of a natural polymer material. On the other hand, recently microcapsules each having a synthetic film capsule wall produced by the "interfacial polymerization" method or by the "in situ polymerization" method have been put to practical use as well. Among the materials for such synthetic film capsule walls, there are included various combinations, e.g., those of isocyanate and water, isocyanate and polyamine, isocyanate and polyol, isothiocyanate and water, isothiocyanate and polyamine, isothiocyanate and polyol, urea and formaldehyde, melamine and formaldehyde, and, acid chloride and amine, in addition to materials for epoxy resin. In comparison with microcapsules having capsule walls formed by a natural polymer material, microcapsules having synthetic film capsule walls are especially advantageous in the manufacture of pressure-sensitive copying paper in that the coating composition including the microcapsules can be prepared in high concentration and accordingly the coating operation can be carried out at a high speed, in that, since the capsule wall structure formed is relatively of high density, oily droplets enclosed in the microcapsules are substantially prevented from natural exudation (this is particularly advantageous in the manufacture of the so-called "self-contained" type pressure-sensitive copying paper in which both the color former microcapsules and the color acceptor are coated on a single surface of a paper sheet), in that they are easy and not expensive to prepare, and in that they have a good resistance to moisture.

However, among microcapsules having synthetic film capsule walls, those utilizing isocyanate compounds are disadvantageous in that they are not so good in the solvent resistance, that, when they are placed in an atmosphere including a solvent, oily droplets in the microcapsules tend to be extracted to come into contact with the color acceptor to incidentally and undesirably develop a color and in that they are easily ruptured, while no handwriting or typewriting force is applied, by incidental and undesirable friction forces applied as by rubbing to produce smudges by color developing.

The principal object of the invention is to provide a novel and improved method for the production of microcapsules each having a synthetic film capsule wall in which the microcapsules obtained have a good resistance against rubbing friction and a good solvent resistance without sacrificing the advantages usually obtained with those microcapsules of such kind.

Another object of the invention is to provide an improved method for the production of microcapsules each having a synthetic film capsule wall in which the microcapsules produced have generally uniform particle sizes.

A further object of the invention is to provide an improved method for the production of microcapsules each having a polyurea film capsule wall which are useful for the manufacture of pressure-sensitive copying paper.

The other objects and advantages of the invention will become apparent from the following detailed description.

SUMMARY OF THE INVENTION

According to the invention, the method for the production of microcapsules comprises the steps of preparing an aqueous medium dissolving at least one homopolymer or copolymer therein, said homopolymer or copolymer including monomer units represented by the general formula:

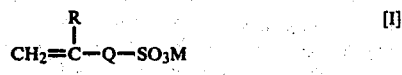

wherein R is hydrogen or alkyl, M is ammonium, sodium, potassium, lithium or hydrogen and Q is further represented by:

or

wherein Y is methylene, ethylene or polymethylene having 3 to 10 carbon atoms, which methylene, ethylene or polymethylene may be substituted by at least one alkyl, dispersing a hydrophobic liquid in said aqueous medium to form an emulsion system including microscopic emulsion droplets of said hydrophobic liquid, said hydrophobic liquid including polyvalent isocyanate therein, and causing interfacial polymerization of said polyvalent isocyanate in said emulsion system to form synthetic microcapsule walls around said droplets of said hydrophobic liquid.

DETAILED DESCRIPTION OF THE INVENTION

According to the invention, an aqueous medium dissolving a specific polymer therein is prepared. In one aspect of the invention, the specific polymer is a homopolymer or copolymer of a monomer represented by the general formula:

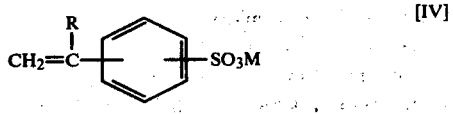

wherein R is hydrogen or alkyl, preferably lower alkyl having 1 to 3 carbon atoms, and M is ammonium, sodium, potassium, lithium or hydrogen. The most typically useful homopolymer of the monomer represented by the formula IV is polyvinylbenzenesulfonic acid or its ammonium, sodium, potassium or lithium salt. Among the copolymers of the monomer represented by the formula IV with another monomer, there are included acrylic acid-vinylbenzenesulfonic acid copolymer, methyl acrylate-vinylbenzenesulfonic acid copolymer, vinylsulfonic acid-vinylbenzenesulfonic acid copolymer, styrene-vinylbenzenesulfonic acid copolymer, vinyl acetate-vinylbenzenesulfonic acid copolymer, acrylamide-vinylbenzenesulfonic acid copolymer, vinylpyrrolidone-vinylbenzenesulfonic acid copolymer, acrylonitrile-vinylbenzenesulfonic acid copolymer, acrolein-vinylbenzenesulfonic acid copolymer, acryloylmorpholine-vinylbenzenesulfonic acid copolymer, their salts with ammonium, sodium, potassium and lithium. Those copolymers may preferably include the monomer units of vinylbenzenesulfonic acid at least by 40%, preferably larger than 60%, most preferably larger than 70%, of the total monomer units.

The above-mentioned homopolymers or copolymers including the monomer units represented by the formula IV may be produced by any of the conventional methods.

In the other aspect of the invention, the specific polymer dissolved in the aqueous medium prepared is a homopolymer or copolymer of the monomer represented by the general formula:

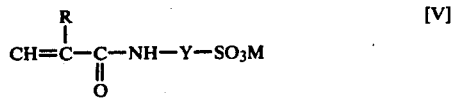

wherein R is the same as described before, Y is methylene, ethylene or polymethylene having 3 to 10 carbon atoms, which methylene, ethylene or polymethylene may be substituted by at least one alkyl, preferably lower alkyl having 1 to 3 carbon atoms and M is ammonium, sodium, potassium, lithium or hydrogen.

Among the monomers represented by the formula V, there are preferably included 2-acrylamido-2-methylpropanesulfonic acids, 2-acrylamido-1-methylpropanesulfonic acids, 2-methacrylamido-2-methylpropanesulfonic acids, and, ammonium, sodium, potassium and lithium salts of the foregoing. Above all, the most preferred are 2-acrylamido-2-methylpropanesulfonic acids represented by the following general formula:

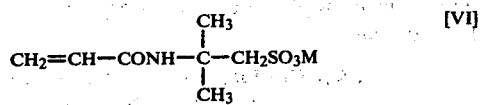

wherein M is ammonium, sodium, potassium, lithium or hydrogen.

The specific polymer including monomer units represented by the formula V may be a homopolymer of a monomer represented by the formula V or a copolymer of a monomer represented by the formula V with another monomer.

Among the monomers copolymerizable with the monomer represented by the formula V, there are included unsaturated monocarboxylic acids (or salts thereof), halogenated products of unsaturated monocarboxylic acids, unsaturated monocarboxylic acid anhydrides, alkyl esters of unsaturated carboxylic acids, alkyl vinyl ethers, etc. Specifically, the following water soluble or water insoluble monomers may preferably be used:

acrylic acid, methacrylic acid, crotonic acid, isocrotonic acid, vinylacetic acid, angelic acid, tiglic acid, allylacetic acid, $\beta,\beta$-dimethylacrylic acid, hydrosorbic acid, isohydrosorbic acid, pyroterebic acid, teracrylic acid, undecylenic acid, oleic acid, elaidic acid, erucic acid, brassidic acid, cinnamic acid, allocinnamic acid, butadiene-1-carboxylic acid, chloroacrylic acid, benzamidoacrylic acid, acetamidoacrylic acid, phthalimidoacrylic acid, acrylic acid chloride, acrylic anhydride, methacrylic anhydride, methyl acrylate, ethyl acrylate, propyl acrylate, butyl acrylate, isobutyl acrylate, t-butyl acrylate, 2-ethylhexyl acrylate, octyl acrylate, isodecyl acrylate, lauryl acrylate, tridecyl acrylate, stearyl acrylate, cyclohexyl acrylate, benzyl acrylate, methyl methacrylate, ethyl methacrylate, propyl methacrylate, butyl methacrylate, isobutyl methacrylate, t-butyl methacrylate, 2-ethylhexyl methacrylate, octyl methacrylate, isodecyl methacrylate, lauryl methacrylate, tridecyl methacrylate, stearyl methacrylate, cyclohexyl methacrylate, benzyl methacrylate, dimethylaminoethyl acrylate, dimethylaminoethyl methacrylate, diethylaminoethyl acrylate, diethylaminoethyl methacrylate, glycidyl acrylate, glycidyl methacrylate, hydroxyethyl acrylate, butoxyethyl acrylate, ethylene glycol diacrylate, ethylene glycol dimethacrylate, triethylene glycol diacrylate, triethylene glycol dimethacrylate, tetraethylene glycol diacrylate, tetraethylene glycol dimethacrylate, 1,3-butylene glycol diacrylate, 1,3-butylene glycol dimethacrylate, 1,6-hexanediol acrylate, 1,6-hexanediol methacrylate, butyl maleate, dibutyl maleate, ethyl fumarate, methyl vinyl ether, ethyl vinyl ether butyl vinyl ether, 2-ethylhexyl vinyl ether, octyl vinyl ether, lauryl vinyl ether, stearyl vinyl ether, acrylamide, diacetone acrylamide, methacrylamide, N-methylolacrylamide, acrylonitrile, acrolein, styrene, $\alpha$-methylstyrene, divinylbenzene, vinyl acetate, vinyl chloride, ethylene, butadiene and N-vinylpyrrolidone.

Among the above monomers, alkyl acrylates, alkyl methacrylates, acrylamide, styrene and N-vinylpyrrolidone are most preferred for the invention.

The homopolymers or copolymers including the monomer units represented by the formula V may be produced by any of the known conventional methods.

The monomer units represented by the formula V which are included in the specific copolymer may be more than 40%, preferably more than 60%, most preferably more than 70% of the total monomer units of the copolymer.

There is no special limitation about the molecular weight range of the specified homopolymers or copolymers including the monomer units represented by the formula IV or V. It may be adjusted by changing the content of a polymerization initiator in the polymerization system, the monomer contents in the polymerization system, the polymerization temperature and/or selective use of a chain transfer agent such as mercaptan. Usually, in the case of the homopolymers or copolymers including the monomer units represented by the formula IV, the molecular weight of the homopolymers or copolymers may preferably be within the range of 5,000 to 10,000,000 and in the case of the homopolymers or copolymers including the monomer units represented by the formula V, the molecular weight of the homopolymers or copolymers may preferably be within the range of 5,000 to 5,000,000.

The sulfo groups of the homopolymers or copolymers including the monomer units represented by the formula IV or the formula V may be in the form of free acids or partially or wholly in the form of salts so far as those homopolymers or copolymers can be dissolved in the aqueous medium. Among the forms of salts of sulfonic acid, there are included salts of sodium, potassium, lithium and ammonium.

The aqueous medium in which the above-mentioned specific homopolymer or copolymer is dissolved may preferably be water or an aqueous solution or dispersion of a hydrophilic material. The aqueous medium may also be a composition comprising water and water-miscible liquid at any composition raito so far as it can dissolve the specified homopolymer or copolymer according to the invention therein.

In order to facilitate to prepared microcapsules and to obtain microcapsules having desired properties, the amount of the above-specified homopolymer or copolymer dissolved in the aqueous medium may be at least 0.1% by weight, preferably at least 0.5% by weight, of the amount of the aqueous medium. The upper limit of the amount of the specified homopolymer or copolymer dissolved in the aqueous medium generally depends on the viscosity of the microcapsule production system and the kind of the device used for the production of microcapsules but may be smaller than 20% by weight, preferably smaller than 10% by weight, of the amount of the aqueous medium.

The aqueous medium may also include, when desired, usual water-soluble polymers, e.g., polyvinyl alcohol, carboxyl-modified polyvinyl alcohol, cation-modified polyvinyl alcohol sulfonated polyvinyl alcohol, polyvinylpyrrolidone, gelatin, gum arabic, carboxymethylcellulose and copolymers of maleic anhydride; surface active agents, e.g., sulfonated oil, polyoxyethylene alkyl ether, sorbitan fatty acid ester and alkylarylsulfonates. The amount of those additional components should not be too much to sacrifice the objects at which the invention aims.

In the preferred embodiment of the invention, polyvalent amines which are reactive with polyvalent isocyanate to form polyurea may preferably be added to the aqueous medium. The polyvalent amines used should have at least two NH or $NH_2$ radicals and must be those which can be dissolved or dispersed in a continuous phase in the aqueous medium. Among useful polyvalent amines for this purpose, there are included aliphatic polyamines such as diethylenetriamine, triethylenetetramine, 1,3-propylenediamine and hexamethylenediamine; adducts of an epoxy compound with aliphatic polyamines; alicyclic polyamines such as piperazine; and heterocyclic polyamines such as 3,9-bis-aminopropyl-2,4,8,10-tetraoxaspiro-[5,5]undecane.

The amount of the polyvalent amine added to the aqueous medium may be decided depending on the kind and amount of polyvalent isocyanate used and the desired hardness of the capsule walls obtained. Preferably, the amount of the polyvalent amine may be within the range of 0.1 to 200 parts by weight, most preferably 1 to 100 parts by weight, per 100 parts by weight of the polyvalent isocyanate.

According to the invention, in the aqueous medium dissolving the specified homopolymer or copolymer therein as described in the above, a hydrophobic liquid as a microcapsule core material is dispersed to form an emulsion system including microscopic emulsion droplets of the hydrophobic liquid. Among the useful hydrophobic liquid materials, there are included natural or synthetic oils such as cotton seed oil, hydrogenated terphenyl, hydrogenated terphenyl derivatives, alkylbiphenyl, alkylnaphthalene, diarylalkane, kerosene, paraffin and dibasic acid ester, e.g., phthalic acid ester. These compounds may be used either solely or in combination.

According to the invention, the hydrophobic liquid which is dispersed in the aqueous medium includes a polyvalent isocyanate therein so that, when the hydrophobic liquid is dispersed in the aqueous medium dissolving the specified homopolymer or copolymer therein, a microcapsule producing system may be established. Among the polyvalent isocyanates useful as the materials for forming synthetic microcapsules according to the invention, there may be included diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-4,4'-biphenyl diisocyanate, 3,3'-dimethylphenylmethane-4,4'-diisocyanate, xylylene-1,4-diisocyanate, xylylene-1,3-diisocyanate, 4,4'-diphenylpropane diisocyanate, trimethylene diisocyanate, hexamethylene diisocyanate, propylene-1,2-diisocyanate, butylene-1,2-diisocyanate, ethylidyne diisocyanate, cyclohexylene-1,2-diisocyanate, cyclohexylene-1,4-diisocyanate and isophorone diisocyanate; diisothiocyanates such as p-phenylene diisothiocyanate, xylylene-1,4-diisothiocyanate and ethylidyne diisothiocyanate, triisocyanates such as 4,4',4''-triphenylmethane triisocyanate, toluene-2,4,6-triisocyanate and trimers of hexamethylenediisocyanate; polyisocyanates such as polymethylene polyphenylisocyanate, 4,4'-dimethyldiphenylmethane-2,2',5,5'-tetraisocyanate; and adducts of the above di-, tri- or polyisocyanate with a compound having a hydrophilic group such as polyamines, polycarboxylic acids, polythiols, polyhydroxyl compounds and epoxy compounds. These polyvalent isocyanates may be used either solely or in combination. A typical combination form of the polyvalent isocyanates would be the combination of an aromatic compound and an aliphatic compound.

The amount of the polyvalent isocyanate included in the hydrophobic liquid may preferably be within the range of 0.02 to 60 parts by weight, most preferably 0.03 to 40 parts by weight, with respect to one part by weight of the hydrophobic liquid.

In case of the manufacture of pressure-sensitive copying paper, a colorless chromogenic material as a color former is also dissolved or dispersed in the hydrophobic liquid. Among the useful color former materials, there are included electron donating organic chromogenic materials such as triarylmethane derivatives such as 3,3-bis(p-dimethylaminophenyl)-6-dimethylaminophthalide (CVL), 3,3-bis(p-dimethylaminophenyl)phthalide and 3-(p-dimethylaminophenyl)-3-(1,2-dimethylindole-3-yl)phthalide; diphenylmethane derivatives such as 4,4'-bis-dimethylaminobenzhydryl-benzylether, N- halophenyl-leucoauramine and N-2,4,5-trichlorophenyl-leucoauramine; fluoran derivatives such as 7-diethylamino-3-chlorofluoran, 7-diethylamino-3-chloro-2-methylfluoran and 2-phenylamino-3-methyl-6-(N-ethyl-p-tolylamino)fluoran; thiazine derivatives such as benzoylleucomethylene blue and p-nitrobenzyl-leucomethylene blue; spiro-compounds such as 3-methyl-spiro-dinaphtopyran, 3-ethyl-spiro-dinaphthopyran, 3-propyl-spiro-dinaphthopyran and 3-propyl-spiro-dibenzopyran. Among the other useful color formers utilizable for the present invention, there may be included a color forming system utilizing the chelate forming reaction between a metal salt and a ligand compound.

In the emulsion system thus prepared in the above-mentioned manner according to the invention, interfacial polymerization of the polyvalent isocyanate is initiated and performed to form a synthetic capsule wall around each of the droplets of the hydrophobic liquid dispersed in the aqueous medium. The most typical reactants which are reactive with the polyvalent isocyanate would be water and polyvalent amine which may be included in the aqueous medium. In that case, a polyurea synthetic film is formed by interfacial polycondensation.

The microcapsules produced according to the invention are effectively prevented from smudging by incidental rubbing friction and show an improved solvent resistance. It is believed that one of the reasons why these advantages can be achieved according to the invention is due to the fact that the microcapsules produced have generally uniform particle sizes owing to the utilization of the specified homopolymer or copolymer which has, among others, a function as a good emulsifier. The microcapsules obtained through the utilization of the conventional technique in which the microcapsules are produced in the presence of polyvinyl alcohol as an emulsifier have usually different particle sizes over a relatively wide range often partly including such a large particle size as 100 microns or larger. In order to obtain microcapsules having relatively uniform particle sizes utilizing the conventional technique, it was inevitable to precisely control the temperature for the emulsifying step. On the contrary, according to the invention, microcapsules having generally uniform particle sizes, not including such an extremely large particle size as 100 microns or larger, can be obtained without any substantial control of the temperature for the emulsifying step. The uniformity of the particle size of the microcapsules obtained according to the invention is so good that more than about 70% of the particles belong to the channel of the peak and its adjoining channels in the volume integration of particles having different particle diameters measured by Coulter Counter. It is believed that this results in enhancing a resistance against rubbing friction forces. Also it might be assumed that the specific homopolymer or copolymer described has another function to provide in cooperation with the other conditions a ground or environment particularly adapted to formation of a highly dense synthetic polymer film at the oil-water interface.

The microcapsules produced according to the invention are particularly useful for the manufacture of pressure-sensitive copying papers, e.g., for any of the top sheet which is coated on the underside thereof with a composition of color former microcapsules, the middle sheet which is coated on the upperside thereof with a composition of an acceptor and also is coated on the underside thereof with the composition of color former microcapsules and the "self-contained" type pressure-sensitive copying paper sheets which has a coating layer including both the color former microcapsules and the color acceptor material. In the "self-contained" type pressure-sensitive copying paper sheets the coating layer including both the color former microcapsules and the color acceptor material may be formed by coating either with the two separate coating compositions including the color former microcapsules and the color acceptor materials, respectively, or with a single coating composition including both the color former microcapsules and the color acceptor material. The microcapsules produced according to the invention are especially advantageous for the production of the latter type pressure-sensitive copying paper sheets utilizing a single coating composition since the color former microcapsules are compatible with the color acceptor material in the single coating composition and the coating layer former without causing any substantial incidental color developing.

The invention according to which microcapsules having generally uniform particles sizes and a good core material retainability can be obtained are also useful for various purposes other than for the manufacture of pressure-sensitive copying papers. As a matter of course, different capsule core materials are used for various uses, respectively.

DETAILED DESCRIPTION OF THE PREFERRED EMBODIMENT

The following samples serve to illustrate the invention in more detail although the invention is not limited to the examples. Unless otherwise indicated, parts and % signify parts by weight and % by weight, respectively.

EXAMPLE 1

6 parts of polymethylene polyphenylisocyanate (Millionate MR 400 manufactured by Nippon Polyurethane Kogyo Kabushiki Kaisha) and 6 parts of a trimer of hexamethylene diisocyanate having isocyanurate ring (Coronate EH manufactured by Nippon Polyurethane Kogyo Kabushiki Kaisha) were dissolved in 100 parts of a solution comprising 4 parts of crystal violet lactone (CVL) in diisopropylnaphthalene (K-113 manufactured by Kureha Kagaku Kogyo Kabushiki Kaisha). The resultant solution was added to 200 parts of 3% aqueous solution (adjusted to pH 6.5 with sodium hydroxide) of polyvinylbenzenesulfonic acid (VERSA-TL600 manufactured by National Starch & Chemical Corporation) which was partly changed to a sodium salt and had a molecular weight of 5,000,000, and emulsified with a homomixer.

The average particle size of the emulsified oily droplets was 5.1 microns and the particle size distribution was sharp. The average particle size mentioned in Examples means the particle size in terms of an average value of the particle diameters calculated from the particle size distribution measured by Coulter Counter manufactured by Coulter Electronics Inc.

Thus obtained emulsion was heated to 80° C. under stirring with a propeller mixer and the stirring was continued for 3 hours at the same temperature. Then, upon cooling it to room temperature, microcapsules were produced.

To thus obtained capsule dispersion, 10 parts of cellulose powder and 50 parts of 20% aqueous solution of oxidized starch were added to prepare a capsule coating composition. The coating composition was coated on one surface of paper sheet of 40 g/m² in an amount of 4 g/m² on dry basis to obtain a capsule coated sheet.

EXAMPLE 2

25 parts of an adduct of trimethylolpropane with tolylene diisocyanate (Coronate L manufactured by Nippon Polyurethane Kogyo Kabushiki Kaisha) was dissolved in a solution comprising 4 parts of crystal violet lactone in a mixed solvent of 90 parts of diisopropylnaphthalene (K-113 manufactured by Kureha Kagaku Kogyo Kabushiki Kaisha) and 10 parts of dimethyl phthalate. The resultant solution was added to 300 parts of 4% aqueous solution (adjusted to pH 6.5 with sodium hydroxide) of polyvinylbenzenesulfonic acid (VERSA-TL500 manufactured by National Starch & Chemical Corporation) which was partly changed to a sodium salt and had a molecular weight of 500,000, and emulsified with a homomixer.

The average particle size of the emulsified oily droplets was 5.5 microns and the particle size distribution was sharp.

The obtained emulsion was heated to 80° C. under stirring with a propeller mixer and the stirring was continued for 3 hours at the same temperature. Then, upon cooling it to room temperature, microcapsules were produced.

With the use of the obtained capsule dispersion, a capsule coated sheet was prepared in the same manner as in Example 1.

EXAMPLE 3

8 parts of polymethylene polyphenylisocyanate (Millionate MR500 manufactured by Nippon Polyurethane Kogyo Kabushiki Kaisha) and 4 parts of hexamethylene diisocyanate were dissolved in 100 parts of a solution comprising 4 parts of crystal violet lactone in diisopropylnaphthalene (K-113 manufactured by Kureha Kagaku Kogyo Kabushiki Kaisha). The resultant solution was added to 150 parts of 2% aqueous solution (adjusted to pH 6.5 with sodium hydroxide) of polyvinylbenzenesulfonic acid (VERSA-TL500 manufactured by National Starch and Chemical Corporation) which was partly changed to a sodium salt and had a molecular weight of 500,000, and emulsified with a homomixer.

The average particle size of the emulsified oily droplets was 5.3 microns and the particle size distribution was sharp.

To thus obtained emulsion, 1.0 parts of diethylene triamine and 0.2 parts of hexamethylene diamine were added. The mixture was stirred at room temperature for 15 minutes and then at 70° C. for 3 hours, and cooled to room temperature to produce microcapsules.

With the use of the obtained capsule dispersion, a capsule coated sheet was prepared in the same manner as in Example 1.

EXAMPLE 4

6 parts of polymethylene polyphenylisocyanate (Millionate MR100 manufactured by Nippon Polyurethane Kogyo Kabushiki Kaisha) and 6 parts of a trimer of hexamethylene diisocyanate having isocyanurate ring (Coronate EH manufactured by Nippon Polyurethane Kogyo Kabushiki Kaisha) were dissolved in 100 parts of a solution comprising 4 parts of crystal violet lactone in diisopropylnaphthalene (K-113 manufactured by Kureha Kagaku Kogyo Kabushiki Kaisha). The resultant solution was added to 150 parts of 1% aqueous solution (adjusted to pH 6.5 with sodium hydroxide) of a copolymer (having a molecular weight of 250,000) which was made from 20% of styrene and 80% of vinylbenzenesulfonic acid, and emulsified with a homomixer.

The average particle size of the emulsified oily droplets was 6.3 microns and the particle size distribution was sharp.

To thus obtained emulsion, 2 parts of a polyamine adduct of 2,2'-bis(4'-hydroxyphenyl)propane, epichlorohydrin and an alkyl amine was added. The mixture was stirred at room temperature for 30 minutes and then at 75° C. for 3 hours, and cooled to room temperature to produce microcapsules.

With the use of the obtained capsule dispersion, a capsule coated sheet was prepared in the same manner as in Example 1.

EXAMPLE 5

5 parts of polymethylene polyphenylisocyanate (Millionate MR100 manufactured by Nippon Polyurethane Kogyo Kabushiki Kaisha) and 7 parts of isophorone diisocyanate were dissolved in 100 parts of a solution comprising 4 parts of crystal violet lactone in diisopropylnaphthalene (K-113 manufactured by Kureha Kagaku Kogyo Kabushiki Kaisha). The resultant solution was added to 140 parts of 3% aqueous solution (adjusted to pH 6.5 with sodium hydroxide) of a copolymer (having a molecular weight of 150,000) which was made from 10% of methyl acrylate and 90% of vinylbenzenesulfonic acid, and emulsified with a homomixer.

The average particle size of the emulsified oily droplets was 5.3 microns and the particle size distribution was sharp.

The obtained emulsion was heated to 85° C. under stirring and the stirring was continued at the same temperature for 5 hours. Then, upon cooling it to room temperature, microcapsules were produced.

With the use of the obtained capsule dispersion, a capsule coated sheet was prepared in the same manner as in Example 1.

CONTROL 1

Example 1 was repeated except that an aqueous solution (adjusted to pH 5.0) of polyvinyl alcohol in which the saponification rate was 88 mol% (PVA-217 manufactured by Kurarey Co., Ltd.) was used instead of the aqueous solution of polyvinylbenzenesulfonic acid.

The average particle size of the emulsified oily dropets was 6.2 microns and the particle size distribution was broad.

CONTROL 2

Example 1 was repeated except that an aqueous solution (adjusted to pH 3.5) of vinyl methyl ether-maleic anhydride copolymer (GANTREZ AN-139 manufactured by General Aniline and Film Corporation) was used instead of the aqueous solution of polyvinylbenzenesulfonic acid.

The average particle size of the emulsified oily droplets was 7.1 microns and the particle size distribution was broad.

CONTROL 3

Example 1 was repeated except that an aqueous solution (adjusted to pH 4.0) of an acid-treated gelatin was used instead of the aqueous solution of polyvinylbenzenesulfonic acid.

The average particle size of the emulsified oily droplets was 6.0 microns and the particle size distribution was broad.

PREPARATION OF AN ACCEPTOR COATED SHEET 65 parts of aluminum hydroxide, 20 parts of zinc oxide, 15 parts of a comelt of 80% of zinc 3,5-di($\alpha$-methylbenzyl)salicylate and 20% of styrene-$\alpha$-methylstyrene copolymer, 5 parts of polyvinyl alcohol in the state of an aqueous solution and 300 parts of water were mixed and the mixture was pulverized in a ball mill to produce a dispersion. To the dispersion, 20 parts of carboxyl-modified styrene-butadiene copolymer in the state of a latex was added to prepare an acceptor coating composition. The coating composition was applied on one surface of a base sheet of 40%/m$^2$ in an amount of 5 g/m$^2$ on dry basis and dried to obtain an acceptor coated sheet.

TEST FOR THE PROPERTIES (1) Heat resistance:

Each capsule coated sheet obtained in Examples and Controls was put on an acceptor sheet so that the coated layers were close to each other and left standing under a pressure of 5 kg/cm$^2$ for 3 hours at 120° C. in an oven. Then the color density on the acceptor coated surface was measured by Macbeth densitometer RD-100R (manufactured by Macbeth Corporation) with the use of Red Filter. The lower the number, the more superior the heat resistance.

(2) Solvent resistance:

Each capsule coating composition prepared in Examples and Controls was coated on the surface without acceptor of the acceptor coated sheet in the same manner as in the preparation of the acceptor coated sheet, and dried to prepare a middle sheet for pressure-sensitive copying system.

The middle sheet was lefted standing in an atmosphere saturated with trichloroethylene at room temperature for one hour and then the color density on the acceptor coated surface was measured in the same manner as in the above test (1). The lower the number, the more superior the solvent resistance.

(3) Rubbing resistance

Each capsule coated sheet obtained in Examples and Controls was put on an acceptor coated sheet so that the coated layers were close to each other and rubbed five times under a pressure of 4 kg/cm$^2$. Then the smudges on the acceptor coated surface was evaluated with the naked eye.

The test results are shown in Table 1.

TABLE 1

|  | Heat resistance | Solvent resistance | Rubbing resistance |
|---|---|---|---|
| Example 1 | 0.11 | 0.24 | A |
| Example 2 | 0.10 | 0.27 | A |
| Example 3 | 0.08 | 0.23 | A |
| Example 4 | 0.07 | 0.25 | A |
| Example 5 | 0.12 | 0.30 | A |
| Control 1 | 0.11 | 0.56 | C |
| Control 2 | 0.14 | 0.72 | C |
| Control 3 | 0.20 | 0.71 | C |

(note)
A: Smudges are little
B: Smudges are a little
C: Smudges are remarkable
D: Smudges are very remarkable In order to clarify the effect of the invention, the following Examples were carried out in which the average particle size of oily droplets was made relatively large.

EXAMPLE 6

2.8 parts of crystal violet lactone and 0.7 parts of benzoyl leucomethylene blue were dissolved in 100 parts of diisopropylnaphthalene (K-113 manufactured by Kureha Kagaku Kogyo Kabushiki Kaisha).

In the solution 4 parts of polymethylene polyphenylisocyanate (Millionate MR-500 manufactured Nippon Polyurethane Kogyo Kabushiki Kaisha) and 8 parts of a trimer of hexamethylene diisocyanate having an isocyanurate ring (Coronate EH manufactured by Nippon Polyurethane Kogyo Kabushiki Kaisha) were dissolved.

Thus obtained oily solution was added to 150 parts of 1.5% aqueous solution (adjusted to pH 6.5 with sodium hydroxide) of 2-acrylamido-2-methylpropanesulfonic acid homopolymer having a molecular weight of 3,000,000, and emulsified with a homomixer.

The average particle size of the emulsified oily droplets was 11.8 microns and the particle size distribution was sharp. The volume percentage of the particles contained in the channel including the peak and its adjoining unit channels in the chart of Coulter Counter was 90.0%.

The emulsion was heated to 85° C. under stirring and the stirring was continued at the same temperature for 3 hours. Then, upon cooling it to room temperature, microcapsules were produced.

With the use of the obtained capsule dispersion a capsule coated sheet was prepared in the same manner as in Example 1.

EXAMPLE 7

2.8 parts of crystal violet lactone and 0.7 parts of benzoyl leucomethylene blue were dissolved in a mixed solvent of 90 parts of diisopropylnaphthalene (K-113 manufactured by Kureha Kagaku Kogyo Kabushiki Kaisha) and 10 parts of dimethyl phthalate. In the resultant solution 30 parts of an adduct of trimethylolpropane with tolylene diisocyanate (Coronate L manufactured by Nippon Polyurethane Kogyo Kabushiki Kaisha) was dissolved.

The oily solution was added to 200 parts of 1% aqueous solution of a copolymer (having a molecular weight of 100,000) which was made from 90% of sodium 2-acrylamido-2-methylpropanesulfonate and 10% of acrylamide, and emulsified with a homomixer.

The average particle size of the emulsified oily droplets was 10.3 microns and the particle size distribution was sharp. The volume percentage of the particles contained on the channel including the peak and its adjoining unit channels in the chart of Coulter Counter was 85.1%.

With the use of the emulsion, a capsule coated sheet was prepared in the same manner as in Example 6.

EXAMPLE 8

An oily solution was prepared in the same manner as in Example 6 except that 5 parts of polymethylene polyphenylisocyanate (Millionate MR400 manufactured by Nippon Polyurethane Kogyo Kabushiki Kaisha), 2 parts of a trimer of hexamethylene diisocyanate having a biuret group (Coronate N manufactured by Nippon Polyurethane Kogyo Kabushiki Kaisha) and 2 parts of isophorone diisocyanate were used as isocyanates.

The oily solution was added to 150 parts of an aqueous solution (adjusted to pH 7.0 with sodium hydroxide) comprising 0.8 parts of 2-acrylamido-2-methylpropanesulfonic acid homopolymer having a molecular weight of 2,000,000 and 1 part of polyvinylbenzenesulfonic acid (VERSA TL500 manufactured by National Starch & Chemical Corporation) having a molecular weight of 500,000, and emulsified with a homomixer.

The average particle size of the emulsified oily droplets was 10.0 microns and the volume percentage of the particles contained in the channel including the peak and its adjoining unit channels in the chart of Coulter Counter was 81.4%.

With the use of the obtained emulsion, a capsule coated sheet was prepared in the same manner as in Example 6.

EXAMPLE 9

An emulsion was prepared in the same manner as in Example 6 except that 2% aqueous solution of 2-methacrylamide-2-methylpropanesulfonic acid homopolymer instead of 1.5% aqueous solution of 2-acrylamido-2-methylpropanesulfonic acid homopolymer.

The average particle size of the emulsified oily droplets was 10.5 microns and the particle size distribution was sharp. The volume percentage of the particles contained in the channel including the peak and its adjoining unit channels in the chart of Coulter Counter was 80.0%.

With the use of the emulsion, a capsule coated sheet was produced in the same manner as in Example 6.

EXAMPLE 10

An emulsion was prepared in the same manner as in Example 6 except that 140 parts of 1.5% aqueous solution of a copolymer (having a molecular weight of 150,000) which was made from 80% of sodium 2-acrylamido-1-methylpropanesulfonate and 20% of ethyl methacrylate instead of 150 parts of 1.5% aqueous solution of 2-acrylamido-2-methylpropanesulfonic acid homopolymer.

The average particle size of the emulsified oily droplets was 9.9 microns and the particle size distribution was sharp. The volume percentage of the particles contained in the channel including the peak and its adjoining unit channels in the chart of Coulter Counter was 85.7%.

With the use of the emulsion, a capsule coated sheet was prepared in the same manner as in Example 6.

EXAMPLE 11

An emulsion was prepared in the same manner as in Example 6 except that an aqueous solution (adjusted to pH of 6.5) of polyvinylbenzenesulfonic acid (VERSA-TL600 manufactured National Starch & Chemical Corporation) which was changed partly to a sodium salt and had a molecular weight of 5,000,000 instead of an aqueous solution of 2-acrylamido-2-methylpropanesulfonic acid homopolymer.

The average particle size of the emulsified oily droplets was 10.5 microns. The particle size distribution was not good as in Example 6 but the volume percentage of the particles contained in the channels including the peak and its adjoining unit channels in the chart of Coulter Counter was 67.8%.

With the use of the emulsion, a capsule coated sheet was prepared in the same manner as in Example 6.

CONTROL 4

A capsule coated sheet was prepared in the same manner as in Example 6 except that an aqueous solution (adjusted to pH 5.0) of polyvinyl alcohol in which the saponification rate was 88 mol% (PVA-217 manufactured by Kurarey Co., Ltd.) was used instead of an aqueous solution of 2-acrylamido-2-methylpropanesulfonic acid homopolymer.

The average particle size of the emulsified droplets was 9.5 microns and the particle size distribution was broad and not sharp. The volume percentage of the particles contained in the channel including the peak and its adjoining unit channels in the chart of Coulter Counter was 47.3%.

CONTROL 5

Example 6 was repeated except that an aqueous solution (adjusted to pH 3.5) of vinyl methyl ether-maleic anhydride copolymer (GANTREZ AN-139 manufactured by General Aniline and Film Corporation) instead of an aqueous solution of 2-acrylamido-2-methylpropanesulfonic acid homopolymer.

The average particle size of the emulsified oily droplets was 10.0 microns and the particle size distribution was broad. The volume percentage of the particles contained in the channel including the peak and its adjoining unit channels in the chart of Coulter Counter was 50.3%.

With the use of the capsule coated sheet and the capsule coating composition prepared in Examples 6 to 11 and Controls 4 to 5, the test for the properties of microcapsules were carried out in the same manner as described hereinbefore.

The test results are shown in Table 2 together with the particle size distribution of emulsified oily droplets.

TABLE 2

|  | Examples | | | | | | Controls | |
| --- | --- | --- | --- | --- | --- | --- | --- | --- |
|  | 6 | 7 | 8 | 9 | 10 | 11 | 4 | 5 |
| Heat resistance | 0.10 | 0.11 | 0.10 | 0.12 | 0.13 | 0.11 | 0.11 | 0.15 |
| Solvent resistance | 0.21 | 0.25 | 0.23 | 0.27 | 0.24 | 0.24 | 0.60 | 0.73 |
| Rubbing resistance* | B | B | B | B | B | C | D | D |
| Particle size distribution I** | 43.2 | 36.9 | 35.4 | 32.1 | 37.0 | 25.4 | 16.5 | 17.1 |

TABLE 2-continued

| | Examples | | | | | | Controls | |
|---|---|---|---|---|---|---|---|---|
| | 6 | 7 | 8 | 9 | 10 | 11 | 4 | 5 |
| II*** | 90.0 | 85.1 | 81.4 | 80.0 | 85.7 | 67.8 | 47.3 | 50.3 |

Note*
A: Smudges are little
B: Smudges are a little
C: Smudges are remarkable
D: Smudges are very remarkable
**The volume percentage of the particles contained in the channel including the peak in the chart of Coulter Counter.
***The volume percentage of the particles contained in the unit channel including the peak and its adjoining unit channels in the chart of Coulter Counter.

EXAMPLE 12

30 parts of cellulose powder was added to the capsule dispersion prepared by the same manner as in Example 6, to prepare a capsule coating composition.

The capsule coating composition was coated on one surface of paper sheet of 40 g/m² in an amount of 6 g/m² and then the acceptor coating composition prepared by the following method was coated on the capsule coating layer in an amount of 8 g/m² on dry basis to prepare the so-called self-contained pressure-sensitive copying sheet.

(Preparation of the acceptor coating composition)

100 parts of acid clay and 4 parts of sodium hydroxide were sufficiently dispersed in 400 parts in water. To the dispersion 30 parts of styrene-butadiene copolymer latex (solid amount of 50%) and 10 parts of 30% aqueous solution of sodium dialkylsulfosuccinate.

EXAMPLE 13

Example 12 was repeated except that the capsule dispersion prepared by the same manner as in Example 8 was used to prepare a self-contained pressure-sensitive copying sheet.

CONTROL 6

Example 12 was repeated except that the capsule dispersion prepared by the same manner as in Control 5 was used to prepare a self-contained pressure-sensitive copying sheet.

EXAMPLE 14

30 parts of cellulose powder and the acceptor coating composition described in Example 12 in an amount of 150 parts on dry basis were added to the capsule dispersion prepared by the same manner as in Example 6 to prepare a capsule-acceptor mixed coating composition.

The mixed coating composition was coated on one surface of paper sheet of 40 g/m² in an amount of 10 g/m² on dry basis to prepare a self-contained pressure-sensitive copying sheet.

EXAMPLE 15

Example 14 was repeated except that the capsule dispersion prepared by the same manner as in Example 8 was used to prepare a self-contained pressure-sensitive copying sheet.

CONTROL 7

Example 14 was repeated except that the capsule dispersion prepared by the same manner as in Control 5 to prepare a self-contained pressure-sensitive copying sheet.

The properties of thus obtained self-contained pressure-sensitive copying sheets were tested by the following methods. The test results are shown in Table 3.

(1) Heat resistance

The copying sheet was left standing in an oven at 120° C. for 5 hours and then the color density on the coated surface was measured by Macbeth densitometer RD-100R manufactured by Macbeth Corporation.

(2) Blue spots

The number of spots produced in 1000 cm² of the coated surface of the untreated copying sheet was measured.

(3) Rubbing resistance

The copying sheet was put on a wood free paper sheet so that the coated layer of the former was closed to a surface of the latter and rubbed five times under a pressure of 4 kg/cm². Then the smudges on the coated surface was evaluated with the naked eye.

TABLE 3

| | Example 12 | Example 13 | Control 6 | Example 14 | Example 15 | Control 7 |
|---|---|---|---|---|---|---|
| Heat resistance | 0.13 | 0.14 | 0.25 | 0.15 | 0.15 | 0.28 |
| Blue spots | 1 | 1 | 10 | 1 | 2 | 10 |
| Rubbing* resistance | A | A | C | B | B | D |

(Note)*
A: Smudges are little.
B: Smudges are a little.
C: Smudges are remarkable.
D: Smudges are very remarkable.

What we claim is:

1. A method for the production of microcapsules comprising the steps of
preparing an aqueous medium dissolving at least one homopolymer or copolymer therein, said homopolymer or copolymer having at least 40% monomer units represented by the general formula:

$$CH_2=\overset{R}{\underset{|}{C}}-Q-SO_3M$$

wherein R is hydrogen or alkyl, M is ammonium, sodium, potassium, lithium or hydrogen and Q is further represented by

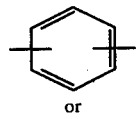

or

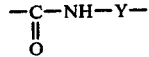

wherein Y is methylene, ethylene or polymethylene having 3 to 10 carbon atoms, which methylene, ethylene or polymethylene may be substituted by at least one alkyl,
dispersing a hydrophobic liquid in said aqueous medium to form an emulsion system including microscopic emulsion droplets of said hydrophobic liquid, said hydrophobic liquid including at least one polyvalent isocyanate therein, and
causing interfacial polymerization of said polyvalent isocyanate in said emulsion system to form synthetic microcapsule walls comprising polyurea bonding around said droplets of said hydrophobic liquid.

2. A method for the production of microcapsules as defined in claim 1, in which said monomer units are vinylbenzenesulfonic acid units represented by the general formula:

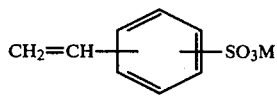

wherein M is ammonium, sodium, potassium, lithium or hydrogen.

3. A method for the production of microcapsules as defined in claim 1, in which said homopolymer or copolymer is polyvinylbezenesulfonic acid or its ammonium, sodium, potassium or lithium salt.

4. A method for the production of microcapsules as defined in claim 1, in which said homopolymer or copolymer is a copolymer of vinylbenzenesulfonic acid with a monomer polymerizable with vinylbenzenesulfonic acid or its ammonium, sodium, potassium or lithium salt.

5. A method for the production of microcapsules as defined in claim 1, in which said monomer units are units of 2-acrylamido-2-methylpropanesulfonic acid, 2-acrylamido-1-methylpropanesulfonic acid and 2-methacrylamido-2-methylpropanesulfonic acid, and, ammonium, sodium, potassium and lithium salts of the foregoing.

6. A method for the production of microcapsules as defined in claim 5, in which said monomer units are 2-acrylamido-2-methylpropanesulfonic acid represented by the general formula:

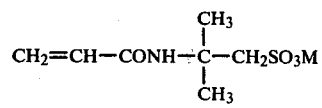

wherein M is hydrogen, sodium, potassium, lithium or ammonium.

7. A method for the production of microcapsules as defined in claim 1, in which said homopolymer or copolymer has a molecular weight within the range of 5,000 to 10,000,000.

8. A method for the production of microcapsules as defined in claim 1, in which the amount of said homopolymer or copolymer dissolved in said aqueous medium is within the range of 0.1 to 20% by weight of the amount of said aqueous medium.

9. A method for the production of microcapsules as defined in claim 8, in which the amount of said homopolymer or copolymer dissolved in said aqueous medium is within the range of 0.5 to 10% by weight of the amount of said aqueous medium.

10. A method for the production of microcapsules as defined in claim 1, in which said aqueous medium further includes at least one polyvalent amine which has at least two NH or $NH_2$ radicals and can be dissolved or dispersed in a continuous phase in said aqueous medium.

11. A method for the production of microcapsules as defined in claim 10, in which the amount of said polyvalent amine is 0.1 to 200 parts by weight with respect to 100 parts by weight of said polyvalent isocyanate.

12. A method for the production of microcapsules as defined in claim 11, in which the amount of said polyvalent amine is 1 to 100 parts by weight with respect to 100 parts by weight of said polyvalent isocyanate.

13. A method for the production of microcapsules as defined in claim 1, in which the amount of said polyvalent isocyanate is 0.02 to 60 parts by weight with respect to one part by weight of said hydrophobic liquid.

14. A method for the production of microcapsules as defined in claim 1, in which the amount of said polyvalent isocyanate is 0.03 to 40 parts by weight with respect to one part by weight of said hydrophobic liquid.

15. A method for the production of microcapsules as defined in claim 1, in which said hydrophobic liquid further includes a colorless chromogenic material dissolved therein.

* * * * *